Patented June 11, 1929.

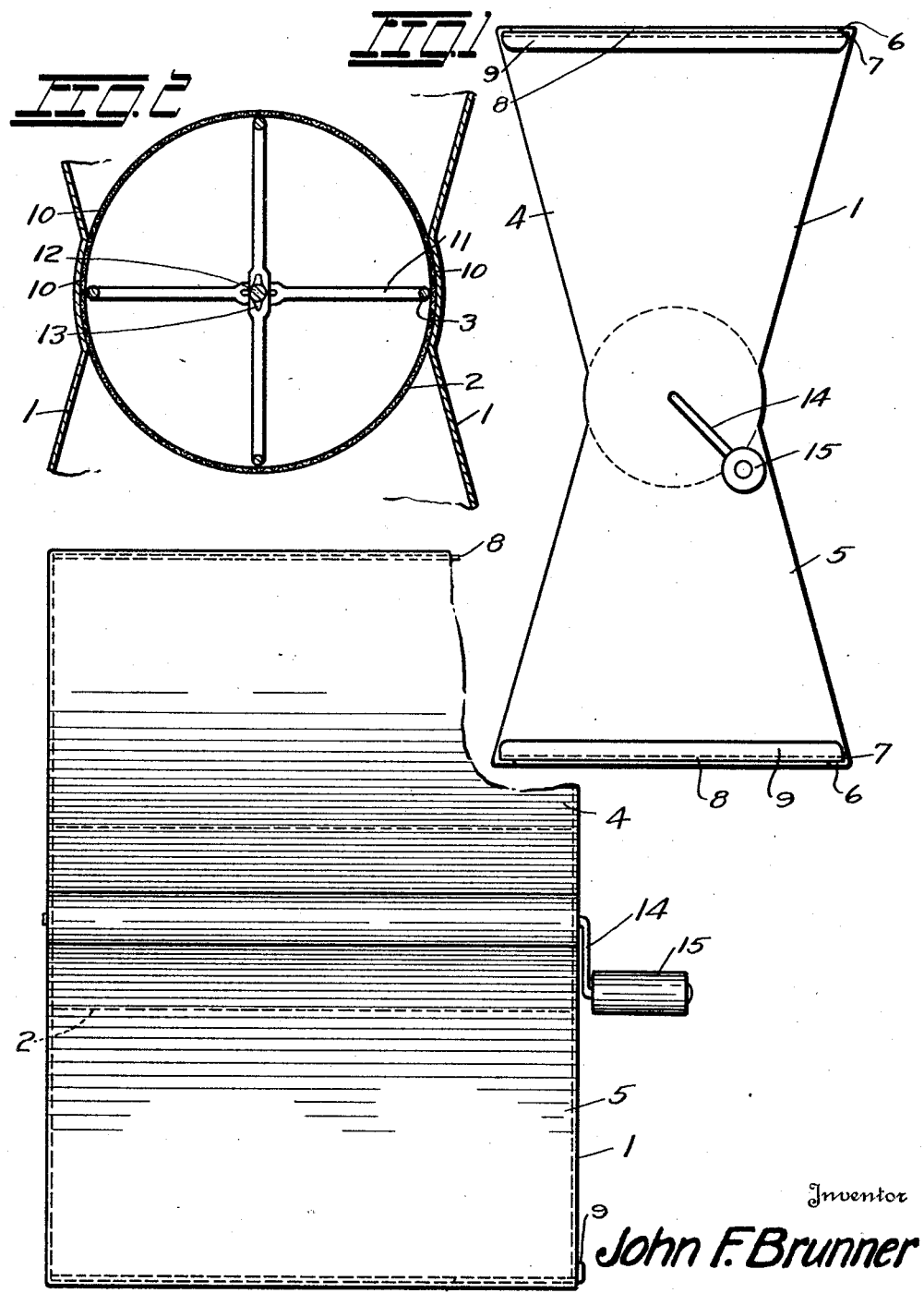

1,716,761

UNITED STATES PATENT OFFICE.

JOHN F. BRUNNER, OF SEATTLE, WASHINGTON.

MULTIFLOUR SIFTER.

Application filed October 18, 1926. Serial No. 142,238.

The invention is a flour sifter having a cylindrical screen arranged so that the flour must pass through the screen twice as it passes from one end to the other and also so that the position may be reversed to permit the flour to pass back through the screen.

The object of the invention is to provide a sifter for flour, or the like, in which the flour may be sifted as many times as may be desired, without removing it from the device.

Another object of the invention is to provide a sifter for flour, or the like, which has a stationary cylindrical screen and is adaptable to permit the flour to pass through both sides of the screen.

And a still further object of the invention is to provide a sifter for flour, or the like, of a simple and economical construction.

With these ends in view the invention embodies a sifter having an upper compartment, a lower compartment, a cylindrical screen between the two compartments, closures at the outer ends of the said compartments, rods on the interior of the said screen and a handle for rotating the said rods.

Other features and advantages of the invention will appear from the following description, taken in connection with the drawings, wherein:

Figure 1 is a view showing the end of the sifter.

Figure 2 is a sectional view through the cylindrical screen.

Figure 3 is a side view of the sifter, with part broken away.

In the drawings the device is shown as it would be made, wherein numeral 1 indicates the casing, numeral 2 the screen and numeral 3 the rotating bars within the screen.

The casing 1 may be made as shown, with an outwardly tapering upper section 4 and a lower section 5 with the sides tapering in the opposite direction. At the ends of the sections are flanges 6 forming slots 7 into which plates 8 with flanges 9 at their outer ends may slide to form a closure for the device. The side walls of the sections 4 and 5 taper toward the center and are attached to the cylindrical screen 2 at the points 10, as shown. It will be noted that the connection between the screen 2 and the walls may be made in any suitable manner and the shape of the walls at this point may be varied so that any desired amount of the walls may engage the screen.

The screen 2, which may be of any suitable size may be made of fine wire, or of any suitable material and may be of any desired mesh.

The rods 3 extend lengthwise of the screen and engage the inner surface thereof. These rods are bent inwards at the ends, forming spiders 11, which are mounted on a central shaft 12, by flattening the shaft, and splitting the rods of the spider, as shown at the point 13 of Figure 2. The outer end of the shaft 12 is bent at right angles forming an arm 14 which has a handle 15 at the outer end by which it may be rotated. It will be observed that as the handle is rotated it will cause the rods 3 to revolve around the inner surface of the screen and thereby scrape the screen so that the flour, or the like, will pass through it.

It will be understood that changes may be made in the construction without departing from the spirit of the invention, one of which changes may be in the design of the casing, another may be in the arrangement of the screen and still another may be in the use of other means for agitating the screen.

The construction will be readily understood from the foregoing description. To use the device, flour or the like may be placed in the upper compartment and as the handle is rotated the flour will pass downward through the screen, passing first into the screen and then through the lower side thereof. After the flour has passed through the screen the device may be turned upside down and then as the handle is rotated, the flour will pass back through both sides of the screen so that it may be re-sifted and as this process may readily be repeated the flour may readily be re-sifted as many times as may be desired without removing it from the sifter. The flour may be removed at any time by removing one of the plates 8. It is understood that although this is described as a flour sifter it may be used for sifting any suitable material.

Having thus fully described the invention, what I claim as new and desire to secure by Letters Patent is:

In a device of the class described, a stationary cylindrical screen, a rotating element having bars engaging the inner surface of the screen rotatably mounted therein, a handle extending beyond the end of the screen by which the rotating element may be operated, an upper and lower rectangular shaped casing with outwardly sloping sides extending from the screen upward and downward thereby forming casings above and below the screen and suitable closures for the outer ends of the said casings.

In testimony whereof I affix my signature.

JOHN F. BRUNNER.